(12) United States Patent
Kelley et al.

(10) Patent No.: US 6,233,636 B1
(45) Date of Patent: May 15, 2001

(54) METHOD AND SYSTEM FOR ALLOWING PCI BUS TRANSACTIONS TO BE PERFORMED AT HIGHER OPERATING FREQUENCIES

(75) Inventors: Richard Allen Kelley, Apex, NC (US); Danny Marvin Neal; Kenneth A. Riek, both of Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,919

(22) Filed: Dec. 3, 1998

(51) Int. Cl.$^7$ ...................................................... G06F 13/38
(52) U.S. Cl. ........................... 710/126; 710/107; 713/501
(58) Field of Search ................................ 710/60, 61, 36, 710/37, 107, 104, 105, 126, 127; 713/501–502

(56) References Cited

U.S. PATENT DOCUMENTS

| | | |
|---|---|---|
| 4,293,949 | 10/1981 | Philippides . |
| 4,608,702 | 8/1986 | Hirzel et al. . |
| 5,392,422 | 2/1995 | Hoel et al. . |
| 5,634,045 | 5/1997 | Goler et al. . |
| 5,694,614 | 12/1997 | Bennett . |
| 5,706,484 | 1/1998 | Mozdzen et al. . |
| 5,737,587 | 4/1998 | Leung et al. . |
| 5,978,859 | * 11/1999 | Guthrie et al. .......................... 710/60 |

* cited by examiner

*Primary Examiner*—Robert Beausoleil
*Assistant Examiner*—Raymond N Phan
(74) *Attorney, Agent, or Firm*—Sawyer Law Group LLP; Leslie A. VanLeeuwen

(57) ABSTRACT

Method and system aspects for enhancing a peripheral component interconnect (PCI) bus to achieve higher frequencies of operation are described. A system aspect includes at least one source synchronous strobe line for providing a source synchronous strobe signal, and at least one PCI compliant device for driving the source synchronous strobe signal to clock data and address on and off a PCI bus, wherein a cycle time for data transactions is reduced. With the present invention, significantly higher frequency capability of PCI is enabled by defining a different clocking signal and protocol for clocking data on and off the bus. A very significant timing budget savings results through the use of a source synchronous strobe for clocking data. Cycle time for bus transactions is therefore reduced, so that the frequency of operation for a synchronous bus is increased. These and other advantages of the aspects of the present invention will be more fully understood in conjunction with the following detailed description and accompanying drawings.

18 Claims, 3 Drawing Sheets

$$T_{cyc} \geq T_{val} + T_{prop} + T_{skew} + T_{su}$$

METHOD AND SYSTEM FOR ALLOWING PCI BUS TRANSACTIONS TO BE PERFORMED AT HIGHER OPERATING FREQUENCIES

FIELD OF THE INVENTION

The present invention relates generally to bus transactions in a computer system, and more particularly to increasing the frequency at which bus transactions occur for a peripheral component interconnect (PCI) synchronous bus structure.

BACKGROUND OF THE INVENTION

The PCI (Peripheral Component Interconnect) Local Bus is a high performance, 32-bit or 64-bit bus with multiplexed address and data lines. The intended use of the bus is as an interconnect mechanism between highly integrated peripheral controller components, peripheral add-in boards, and processor/memory systems. The PCI architecture supports many complex features, including I/O expansion through PCI-to-PCI bridges, peer-to-peer (device-to-device) data transfers between sending devices (masters) and receiving devices (targets), as well as, multi-function devices and both integrated and plug-in devices. A "transaction" on the PCI bus generally refers to the exchange of data between PCI bus devices, categorically called "agents". A "master" is the agent requesting control of the bus for initiating a transaction. A "target" is the selected agent which completes the transaction. Each master has a separate bus access request and bus grant signal. Details of the PCI bus architecture are defined in the PCI Local Bus Specification, Revision 2.1, available from PCI Special Interest Group, Oregon, which is incorporated herein by reference.

The PCI definition currently supports transactions at a frequency up to 66 megaHertz (MHz). The PCI architecture utilizes a separate non-bused clock line to each PCI device on the bus for clocking control, address, and data signals of each transaction in a synchronous fashion. With the use of separate non-bused clock lines to each PCI device, the following timing budget requirements result, as represented by the timing diagram illustrated in FIG. 1. Accordingly, as is seen the total cycle-time for a transaction (Tcyc) is represented by the following equation:

$$Tcyc \leq T_{val} + T_{prop} + Tskew + Tsu$$

where: T valid (Tval) is the allocated time for a device to place valid data on the bus relative to the appropriate clock edge of the clock signal in the device. T setup (Tsu) is the time allocated for a device to clock data off the bus from the appropriate clock edge of the clock signal in the device. T propagation (Tprop) is the propagation time of the signals across the bus. T skew (Tskew) is the clock skew between the clock signals present in the devices for the sender and receiver of data on the bus.

For the current PCI definition, Tval is 6 ns (nanoseconds), Tsu is 3 ns, Tskew is 1 ns, and Tprop is 5 ns, providing a total cycle time of 15 ns, and a resultant frequency of 66 MHz. The timing budget that establishes the cycle time for transactions tightens as the frequency gets higher, since the total cycle time Tcycle becomes smaller. While 66 MHz has conventionally been a fast enough operating frequency, advancements in device technology create opportunities to operate at even higher operating frequencies. Unfortunately, the current definition and timing characteristics for the PCI architecture limit the highest frequency that is achievable to 66 Mhz.

Accordingly, a need exists for a system and method for allowing transactions to be performed at higher frequencies on a PCI bus architecture. The system and method should be compatible with existing architectures, should be easy to implement and cost effective. The present invention addresses such a need.

SUMMARY OF THE INVENTION

The present invention meets this need and provides method and system aspects for enhancing a peripheral component interconnect (PCI) bus to achieve higher frequencies of operation. A system aspect includes at least one source synchronous strobe line for providing a source synchronous strobe signal, and at least one PCI compliant device for driving the source synchronous strobe signal to clock data on and off a PCI bus, wherein a cycle time for bus transactions is reduced.

With the present invention, significantly higher frequency capability of PCI is enabled by defining a different clocking signal and protocol for clocking data on and off the bus. A very significant timing budget savings results through the use of a source synchronous strobe for clocking data. Cycle time for bus transactions is therefore reduced, so that the frequency of operation for a synchronous bus is increased. These and other advantages of the aspects of the present invention will be more fully understood in conjunction with the following detailed description and accompanying drawings.

DESCRIPTION OF THE INVENTION

The present invention relates to increasing operational frequency of a synchronous bus structure. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
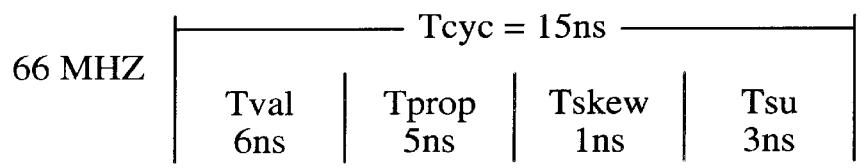
FIG. 1 illustrates a timing budget for a current 66 Mhz PCI architecture.
Figure 2:
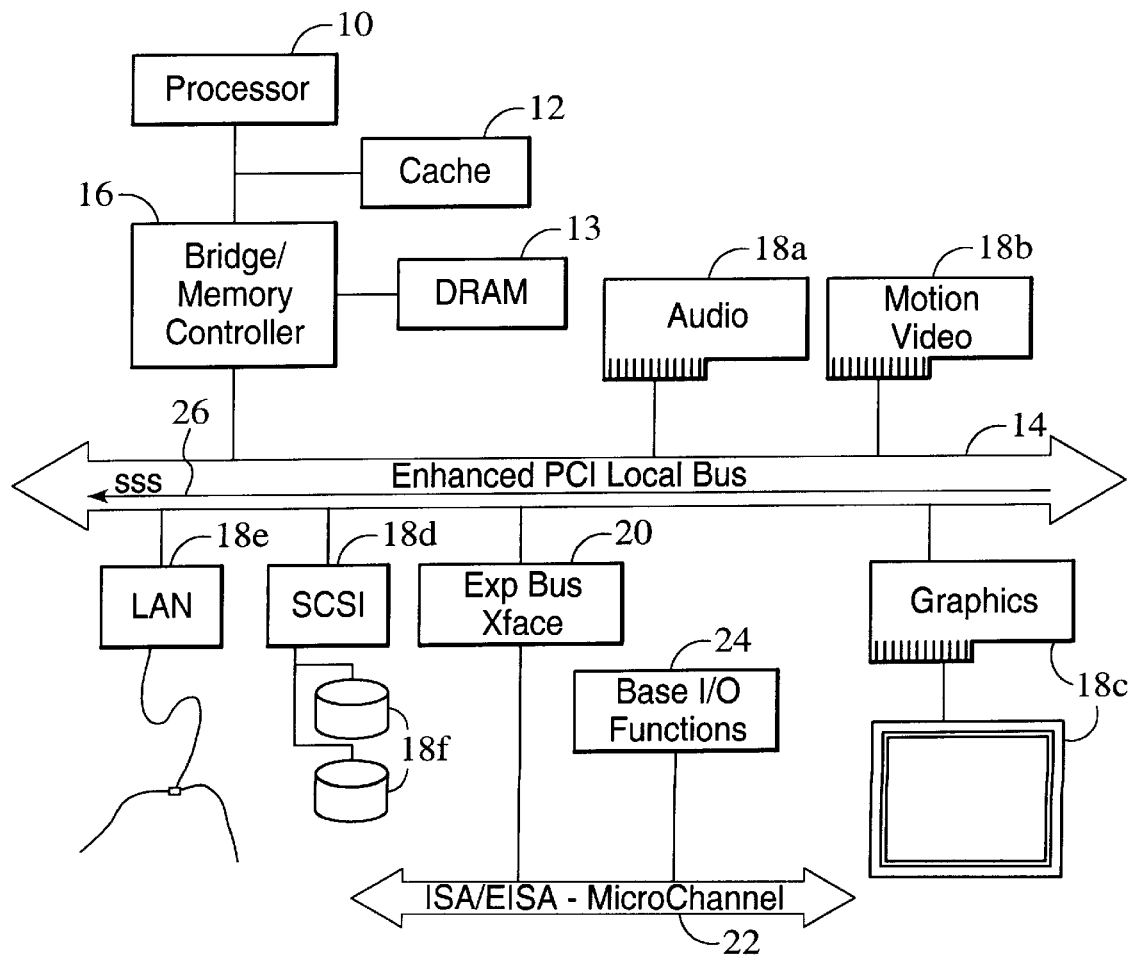
FIG. 2 illustrates a block diagram of a enhanced PCI Local Bus system in accordance with the present invention.

FIG. 2 illustrates a basic block diagram of an enhanced PCI Local Bus system architecture in accordance with the present invention. As shown, the system includes a processor 10, such as a PowerPC processor from IBM Corporation, Inc., coupled to memory e.g., cache 12 and DRAM 13 (dynamic random access memory), that operates according to an operating system (O/S) to perform basic tasks in the computer system and act as a platform for application programs. The processor 10 is coupled to an enhanced PCI bus 14 via PCI bridge component 16.

The bridge 16 provides a low latency path through which the processor 10 may directly access other PCI compliant devices 18 mapped in the memory or I/O address space and also provides a high bandwidth path allowing other PCI compliant devices 18 acting as master devices to have direct access to cache 12 and DRAM 13. The bridge 16 may optionally include such functions as data buffering/posting and PCI central functions, e.g., arbitration, as is well understood by those skilled in the art. Included as examples of other PCI compliant devices 18 are audio device 18a, motion video device 18b, display graphics device 18c, hard drive devices and SCSI interface controller 18d, and LAN (local area network) controller interface device 18e. As is further shown, an expansion bus interface 20 may also be attached to the enhanced PCI bus 14 to bridge to an ISA/EISA microchannel bus 22 and attached I/O functioning devices 24 to the enhanced PCI bus 14. Of course, the number and types of components shown is meant to be illustrative and not restrictive of an embodiment of the present invention.

Figure 3:
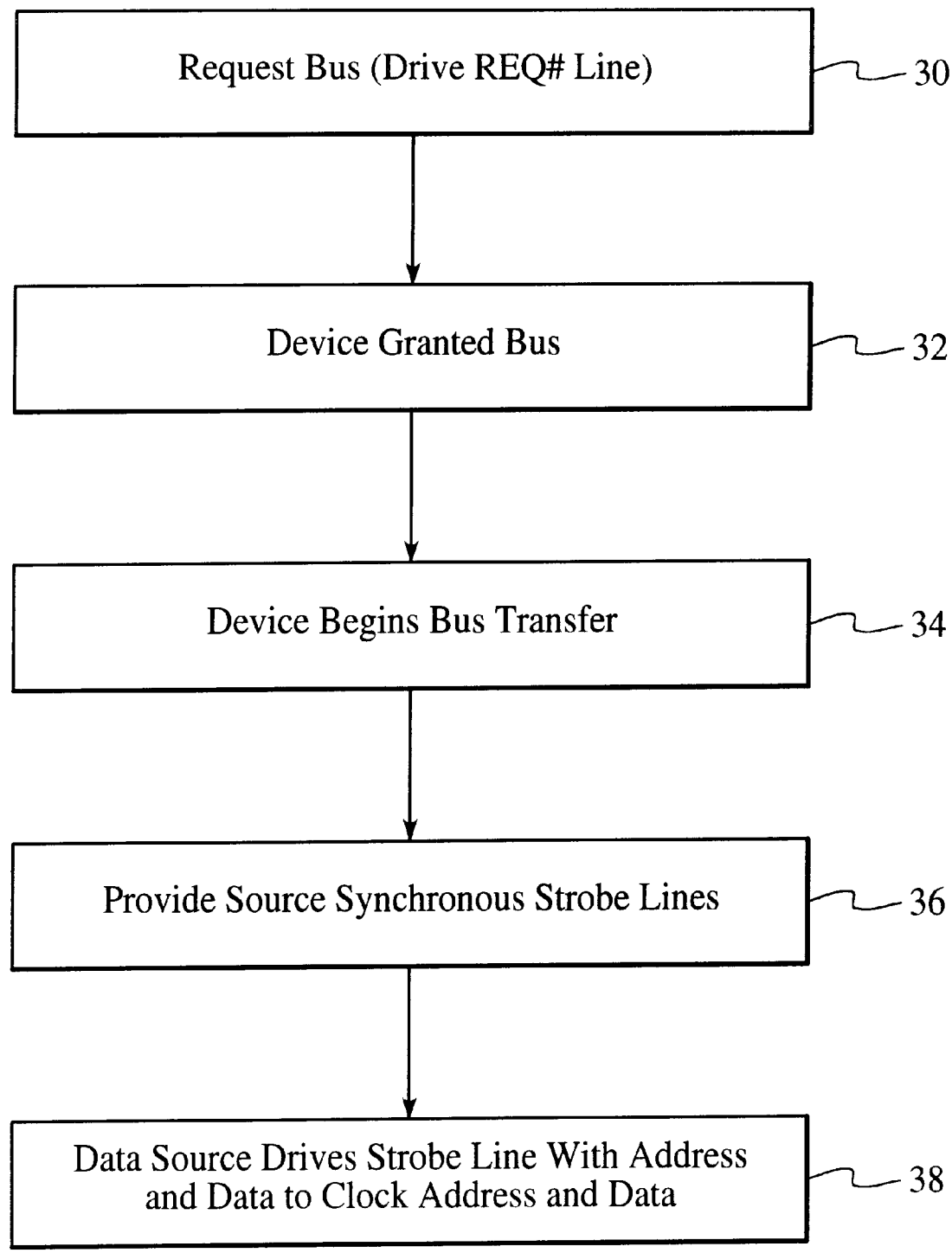
FIG. 3 illustrates a flow diagram of enabling higher frequency capability on a PCI bus in accordance with the present invention.
Figure 4:
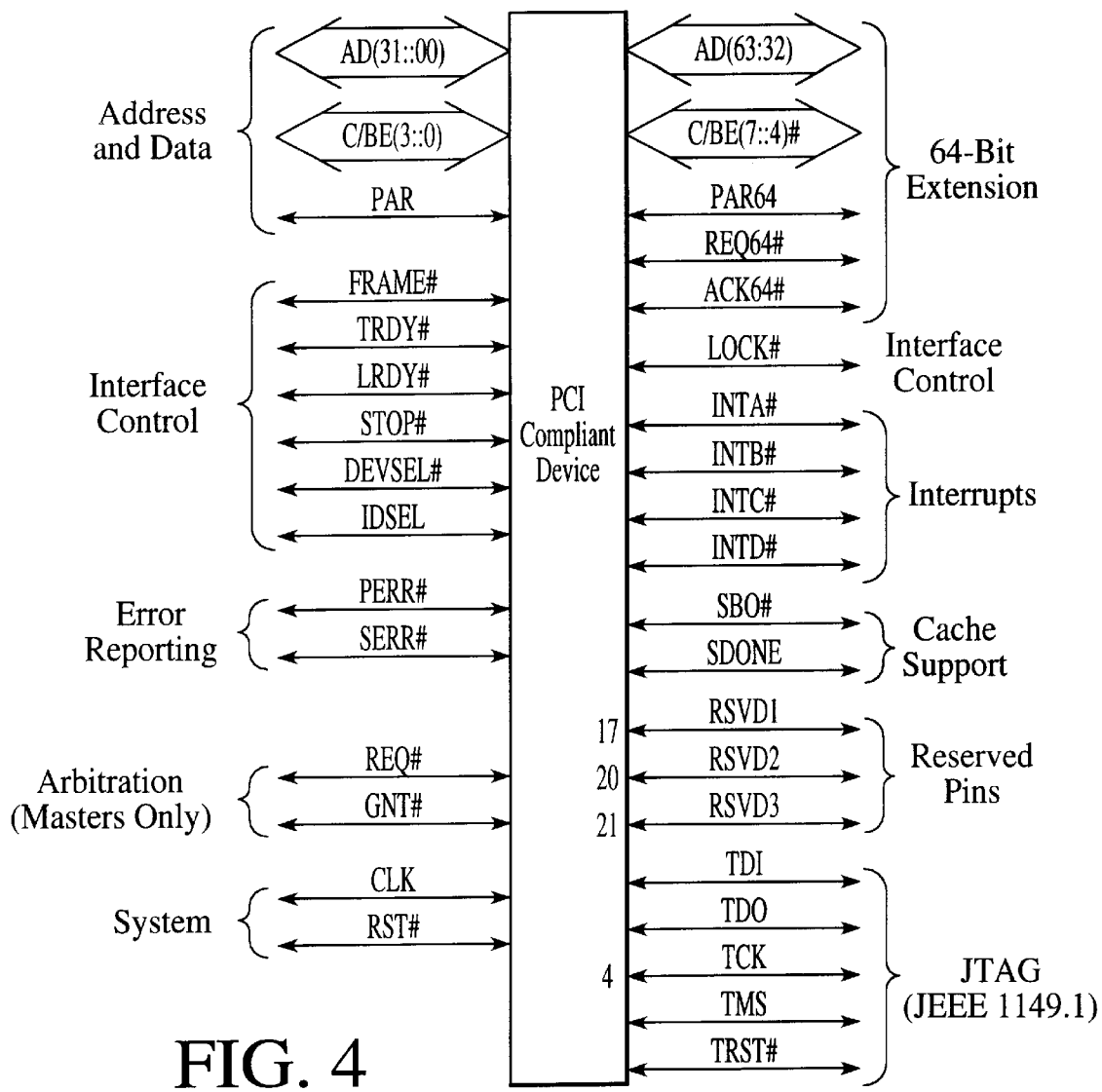
FIG. 4 illustrates a listing of signal designations of a PCI compliant device.

FIG. 3 illustrates a basic block flow diagram of a process in accordance with the present invention. The process begins requesting the bus by a device, via step 30. Next, the device is granted the bus, via step 32. Thereafter, the device begins the bus transfer, via step 34. Next, at least one strobe signal line is provided on the PCI bus, via step 36. The at least one strobe line is represented by an SSS (source synchronous strobe) line 26 in FIG. 2. In a preferred aspect, a reserved pin of a PCI compliant device attached to the enhanced PCI bus 14 is utilized for the strobe signal line. FIG. 4 illustrates a pin designation diagram of a typical PCI compliant device. Reserved pin(s) suitable for use with a source synchronous strobe line are shown as RSVD1, RSVD2, and RSVD3. Given the limited number of reserved pins available, the use of a single pin is preferable. Of course, more than one signal line may be utilized, if desired. Thus, utilizing two reserved pins, with one dedicated for a master strobe signal line and a second dedicated for a target strobe signal line, may be performed.

Bus transactions then occur, the bus transactions include the source synchronous strobe signal. The source synchronous strobe signal is provided by an agent to clock the data and address on/off the bus, via step 38. Thus, if a single strobe line is utilized, a master agent drives the strobe line with the data on a write transaction, while a target agent drives the strobe line with the data on a read transaction. For example, Bridge/Memory Controller 16 acts as a master agent when writing data to target storage device 18d via the enhanced PCI bus 14. Thus, the Bridge/Memory Controller bridge 16, drives the SSS line 26 with the data being written. Signalling for control of the bus is provided as is standardly understood. As a result of the use of the source synchronous strobe, an enhanced timing relationship and budget results for bus transactions, as described with reference to the timing diagram of FIG. 5.

Figure 5:
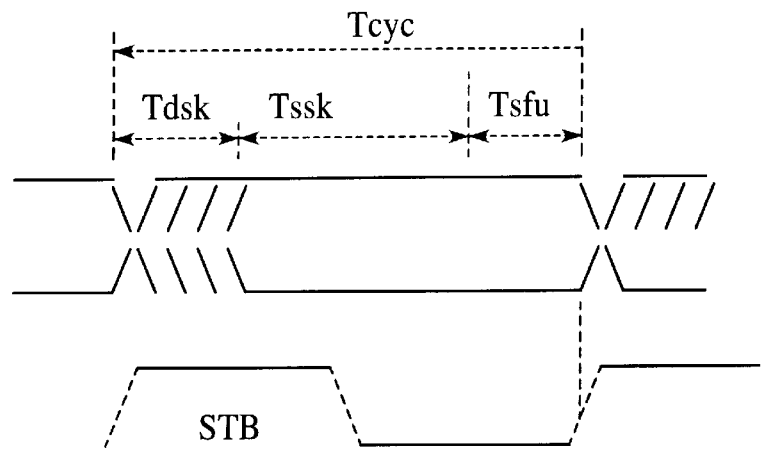
FIG. 5 illustrates a timing diagram for the timing budget resulting in accordance with the present invention.

As shown in FIG. 5, a total cycle time (Tcyc) for a strobe signal (STB) on SSS line 26 during a bus transaction is provided utilizing the following equation:

$$Tcyc = Tdsk + Tssk + Tstu$$

wherein: Tdsk is data skew at the master agent; Tssk is the signal skew across the system; Tstu is the set up skew at the target. New timing requirements would be about 2 ns each for Tdsk, Tssk, and Tstu, resulting in a total cycle time of about 6 ns, i.e, a maximum frequency of 166 Mhz. Preferably, to meet the Tssk time of 2 ns, the line net SSS length is made substantially equal to a longest data line length, e.g., within +/−0.1 inch.

Accordingly, through the use of the source synchronous strobe signal the timing budget for performing transactions is significantly decreased. Thus, the use of a source synchronous strobe signal for synchronous bus transactions allows far greater operating frequencies in a straightforward and efficient manner.

Although the present invention has been described in accordance with the embodiments shown, one of ordinary skill in the art will readily recognize that there could be variations to the embodiments and those variations would be within the spirit and scope of the present invention. By way of example, although the preferred embodiment is described with reference to a PCI bus, the techniques are applicable to other synchronous bus structures. Accordingly, many modifications may be made by one of ordinary skill in the art without departing from the spirit and scope of the appended claims.

What is claimed is:

1. A method for enhancing a peripheral component interconnect (PCI) bus to achieve higher frequencies of operation, the method comprising:

(a) providing at least one strobe line; and (b) driving the at least one strobe line to clock data and address on and off a PCI bus, including (b1) driving the at least one strobe line with address and data with a resulting data skew time period, a system skew time period, and a set up skew time period making up a total new time period at a given frequency, wherein a cycle time for bus transactions is reduced.

2. The method of claim 1 wherein the providing step (a) further comprises (a1) the step of providing at least one reserved signal pin for the at least one strobe line.

3. The method of claim 1 wherein the driving step (b) further comprises the step of (b1) driving the at least one strobe line by a master agent during a write data transfer.

4. The method of claim 1 wherein the at least one strobe line is approximately equal in length to a longest data line of the PCI bus.

5. The method of claim 3 wherein the driving step (b) further comprises the step of (b2) driving the at least one strobe line by a target agent during a read data transfer.

6. The method of claim 1 wherein the time period comprises about 6 nanoseconds.

7. A system for enhancing a peripheral component interconnect (PCI) bus to achieve higher frequencies of operation, the system comprising:

at least one source synchronous strobe line; and at least one device for driving the at least one source synchronous strobe line to clock data and address on and off a PCI bus, including driving the at least one source synchronous strobe line with address and data with a resulting data skew time period, a system skew time period, and a set up skew time period making up a total new time period at a given frequency, wherein a cycle time for data transactions is reduced.

8. The system of claim 7 wherein at least one device comprises a PCI compliant device.

9. The system of claim 7 in which the at least one source synchronous strobe line further comprises at least one reserved signal pin of the PCI compliant device.

10. The system of claim 7 wherein the PCI compliant device comprises a master agent during a write data transfer.

11. The system of claim 7 wherein the at least one source synchronous strobe line comprises a signal line with a length approximately equal to a longest data line of the PCI bus.

12. The system of claim 10 wherein the PCI compliant device comprises a target agent during a read data transfer.

13. The system of claim 7 wherein the time period comprises about 6 nanoseconds.

14. A method for increasing operational frequency of data transactions on a synchronous data bus, the method comprising:
   (a) performing data transfers among devices on a synchronous bus; and
   (b) utilizing a strobe signal line to reduce time constraints during the data transfers, wherein a higher frequency of operation is achieved by driving the strobe signal line with address and data with a resulting data skew time period, a system skew time period, and a set up skew time period making up a new time period at a given frequency.

15. The method of claim 14 wherein the synchronous bus comprises a PCI bus.

16. The method of claim 14 wherein the higher frequency of operation comprises a frequency of up to at least about 166 MHz.

17. The method of claim 15 wherein the utilizing step (a) further comprises the step of (a1) utilizing a reserved pin signal for the strobe signal line.

18. The method of claim 14 wherein the utilizing step (a) further comprises the step of (a1) driving the strobe signal line by a master agent during a write operation and by a target agent during a read operation on the synchronous bus.

* * * * *